United States Patent [19]

Satomi

[11] 4,385,247
[45] May 24, 1983

[54] FOUR-PHASE HYBRID TYPE STEPPING MOTOR

[75] Inventor: Hirobumi Satomi, Kashiwa, Japan
[73] Assignee: Oriental Motor Co., Ltd., Tokyo, Japan
[21] Appl. No.: 255,258
[22] Filed: Apr. 17, 1981
[30] Foreign Application Priority Data
  Jul. 2, 1980 [JP] Japan .................................. 55-89131
[51] Int. Cl.³ .......................................... H02K 37/07
[52] U.S. Cl. .................................... 310/49 R; 318/696
[58] Field of Search ......................... 310/49, 162–165; 318/696, 685

[56] References Cited

U.S. PATENT DOCUMENTS

| | | | |
|---|---|---|---|
| 3,621,312 | 11/1971 | Palmero | 310/49 |
| 3,866,104 | 2/1975 | Heine | 310/49 X |
| 3,875,437 | 4/1975 | Hara et al. | 310/49 |
| 3,978,356 | 8/1976 | Spiesberger | 310/49 |
| 4,029,977 | 6/1977 | Chai et al. | 310/49 |
| 4,095,161 | 6/1978 | Heine et al. | 310/49 X |
| 4,155,018 | 5/1979 | Oudet | 310/49 |
| 4,234,808 | 11/1980 | Geppert et al. | 310/49 |

Primary Examiner—Donovan F. Duggan
Attorney, Agent, or Firm—Birch, Stewart, Kolasch & Birch

[57] ABSTRACT

A four-phase hybrid type stepping motor is disclosed, which comprises a rotor and eight stator poles each formed on a plane facing to an outer side surface of the rotor with a plurality of stator teeth, wherein a pitch between a center of the stator teeth of the first one of the eight stator poles and a center of the stator teeth of the fourth stator pole, a pitch between the center of the stator teeth of the fourth stator pole and a center of the stator teeth of the seventh stator pole and a pitch between the center of the stator teeth of the seventh stator pole and a center of the stator teeth of the second stator pole are common and equal to $\tau_c$ defined as follows:

$$\tau_c = \frac{3 \cdot Z_R + a}{8} \cdot \tau_R$$

$$a = 8N - 3 \cdot Z_R \pm 1$$

where $Z_R$ is the number of the rotor teeth and N is an integer close to $3 \cdot Z_R/8$.

3 Claims, 6 Drawing Figures

FOUR-PHASE HYBRID TYPE STEPPING MOTOR

BACKGROUND OF THE INVENTION

1. Field of the Invention

The present invention relates to a hybrid type stepping motor having eight (8) stator poles equiped with four (4)-phase connected windings.

2. Description of the Prior Art

In the conventional hybrid type stepping motor in which the exciting field is switched phase by phase, the stepping angle $\theta_s$ can be represented by $$\theta_s = 360°/2 \cdot n \cdot Z_R$$

where n is the number of phases and $Z_R$ is the number of teeth of the rotor. Futhermore, the load angle $\theta_L$ at the maximum torque is determined by the number of teeth ($Z_R$) and can be represented by $$\theta_L = 360°/4 \cdot Z_R$$

Therefore, a relation $\theta_L = k \cdot \theta_s$ is established between the step angle $\theta_s$ and the load angle $\theta_L$ where k is a constant. In this case, in order to make possible to accelerate or decelerate the motor at a high rate without misstepping, the constant k should be as larger than 1 as possible.

Since the conventional hybrid type stepping motor having 8 stator poles is usually provided with 2-phase connected windings, the step angle $\theta_s$ is $360°/4 \cdot Z_R$ and thus a relation $\theta_L = \theta_s(k=1)$ is established between the two angles. Therefore, when it is desired to use that motor in a high speed range, it is difficult to set the rise time and the fall time for the slow-up and slow-down motions, and, further, there is the turbulence or hunting phenomenon in some specific input frequency range.

SUMMARY OF THE INVENTION

In view of these defects of the conventional stepping motor of the type, an object of the present invention is to provide a four-phase hybrid type stepping motor whose basic step angle is one half that of the conventional motor, so that the high speed response is much improved and the stepping motion is stabilized.

The above object is achieved, according to the present invention, by providing a four-phase hybrid type motor comprising a rotor and eight stator poles each formed on a plane facing to an outer side surface of the rotor with a plurality of stator teeth, wherein a pitch between a center of the stator teeth of the first one of the eight stator poles and a center of the stator teeth of the fourth stator pole, a pitch between the center of the stator teeth of the fourth stator pole and a center of the stator teeth of the seventh stator pole and a pitch between the center of the stator teeth of the seventh stator pole and a center of the stator teeth of the second stator pole are common and equal to $\tau_c$ defined as follow:

$$\tau_c = \frac{3 \cdot Z_R + a}{8} \cdot \tau_R$$

$$a = 8N - 3 \cdot Z_R \pm 1$$

where $Z_R$ is the number of the rotor teeth and N is an integer close to $3 \cdot Z_R/8$.

Other objects and features of the present invention will become apparent by reading the following description of the preferred embodiments of the present invention with reference to the accompanying drawings.

DESCRIPTION OF THE PREFERRED EMBODIMENTS

Figure 1:
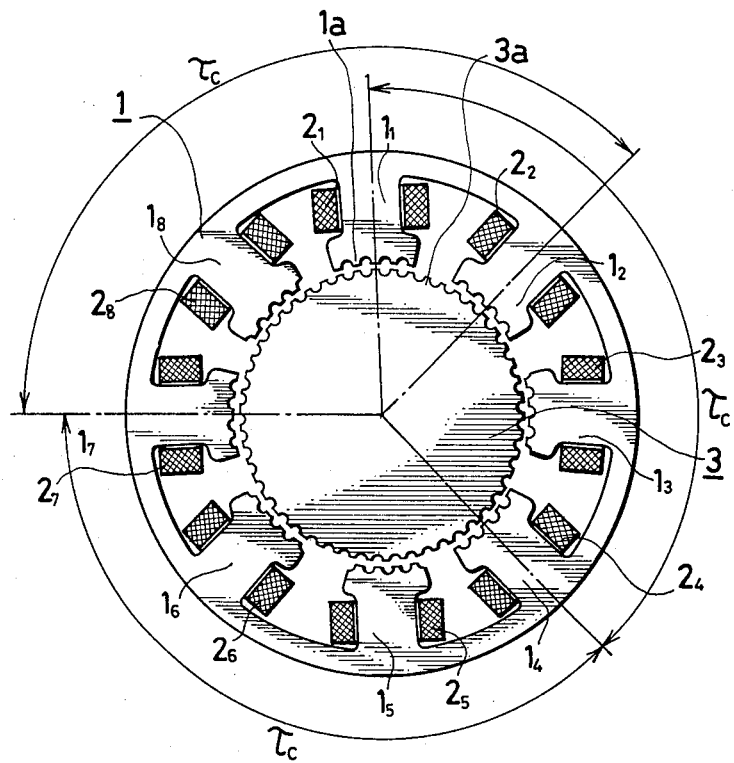
FIG. 1 illustrates schematically the relation between the stator and the rotor of the four-phase stepping motor according to the present invention.

The stepping motor according to the present invention has eight (8) stator poles $1_1, 1_2, \ldots 1_8$ formed on a stator 1 as shown in FIG. 1. A plurality of stator teeth $1a$ is formed on each of the stator poles with teeth pitch $\tau_s$ which satisfies the following equation.

$$\tau_s = K \cdot \tau_R (0.9 \leq K \leq 1.1) \quad (1)$$

where $\tau_R$ is a tooth pitch of teeth formed on an outer side surface of a rotor 3.

Furthermore, the respective stator poles $1_1, 1_2, \ldots 1_8$ are arranged such that pairs of opposing ones of the stator poles (e.g. $1_1$ and $1_5$) are separated by 180°, respectively, and the stator teeth $1a$ of certain ones of the stator poles are arrnaged such that a pitch between a center of the stator teeth of the first stator pole and a center of the stator teeth of the fourth stator pole, a pitch between the center of the stator teeth of the fourth stator pole and a center of the stator teeth of the seventh stator pole and a pitch between the center of the stator teeth of the seventh stator pole and a center of the stator teeth of the second stator pole are common and equal to $\tau_c$ defined by the following equations $$\tau_c = \frac{3 \cdot Z_R + a}{8} \cdot \tau_R \quad (2)$$

$$a = 8N - 3 \cdot Z_R \pm 1 \quad (2')$$

where $Z_R$ is the number of the rotor teeth and N is an integer close to $3 \cdot Z_R/8$.

N is the equation (2') is empirically determined and is selected as $N = 19$ in this embodiment. The sign ($\pm$) in the right term of the equation (2') should be determined so that the absolute value of a becomes nearly equal to zero in view of efficiency and, in this embodiment, the minus sign ($-$) is selected. If the plus ($+$) sign is selected, then the rotational direction of the exciting manetic field becomes coincident to the rotational direction of the rotor 3 while if the minus sign is selected, the two directions becomes opposite to each other.

When the number $Z_R$ of the teeth formed on the outer side surface of the rotor 3 is even, the teeth $1a$ of the paired stator poles are arranged so that they are shifted from each other by $\frac{1}{2} \tau_s$ and when $Z_R$ is odd number, the teeth $1a$ of the paired stator poles are arranged such that the protruded portions thereof are faced each other and the valley portions thereof are faced each other, respectively.

Figure 2:
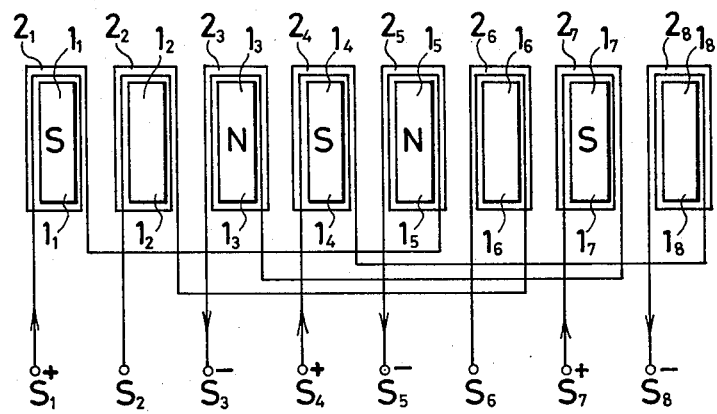
FIG. 2 illustrates the connection of the windings to be mounted on the respective stator poles.

Windings 2, 2, ... 2 are mounted on the stator poles 1, 1, ... 1, respectively. The windings $2_1$ and $2_5$, $2_2$ and $2_6$, $2_3$ and $2_7$, and $2_4$ and $2_8$ are paired, resepctively, each pair being connected in series, as shown in FIG. 2, to form four phases. Each pair of the windings is wound in hetero polar fashion, so that, when a current is supplied to, for example, the pair of the windings $2_1$ and $2_5$ and when the stator pole $1_1$ is magnetically N pole (or S pole), the stator pole $1_5$ is faced thereto becomes S pole (or N pole). It may be possible to connect the paired windings in parallel with each other. In such case, the paired windings e.g. windings $2_1$ and $2_5$, are wound on the stator poles $1_1$ and $1_5$, respectively, to make them heteropolar magnetic poles.

Figure 3:
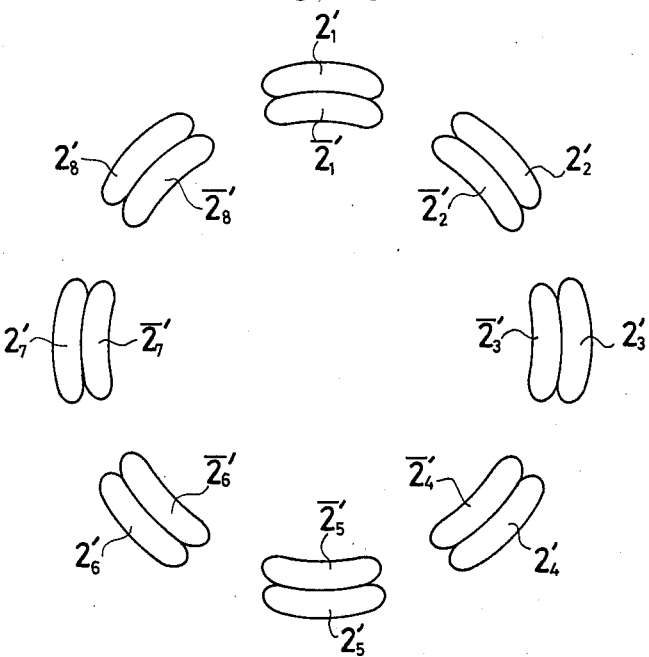
FIG. 3 illustrates the concept of the bifilar winding.
Figure 5:
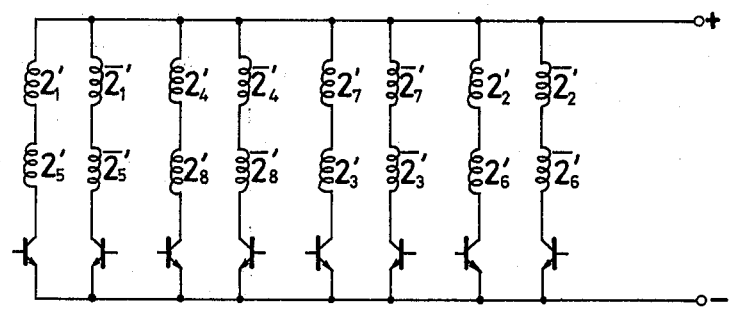
FIG. 5 is an example of a circuit diagram of the drive circuit for driving the windings wound in bifilar fashion.

Although the windings $\overline{2}_1, \overline{2}_2 \ldots \overline{2}_8$ are shown as being wound in monofilar fashion in FIG. 2, it may be possible to constitute the whole winding with winding pairs $2_1'$, $2_1'$: $2_2'$, $2_2'$: ... $2_8'$, $2_8'$; respectively, to form bifilar winding arrangement as shown in FIG. 3. In such case, the respective windings may be connected as shown in FIG. 5.

Figure 6:
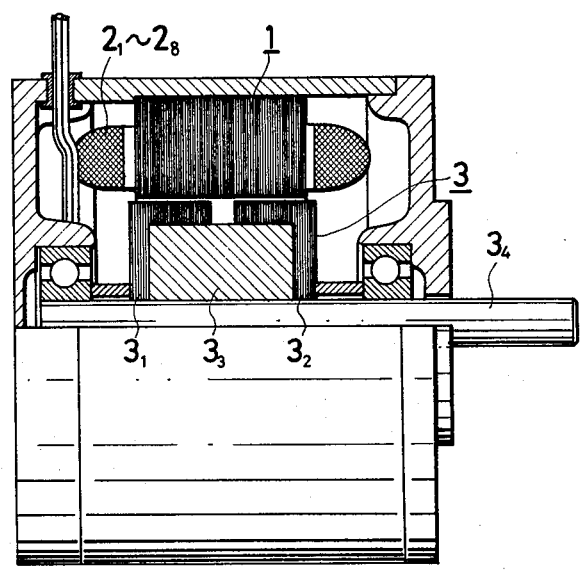
FIG. 6 is a partially cross-sectioned view of the stepping motor according to the present invention.

The rotor 3 is constituted with a pair of rotor caps $3_1$ and $3_2$, a magnet $3_3$ disposed between the rotor caps $3_1$ and $3_2$ and a rotor shaft $3_4$ of non-magnetic material, as shown in FIG. 6. The rotor caps $3_1$ and $3_2$ are formed on the peripheral side surface thereof with the teeth $3_a$ (FIG. 1) with the pitch $\tau_R$, respectively, and assembled such that the teeth $3_a$ of the rotor cap $3_1$ are shifted by ½ pitch from those of the rotor cap $3_2$. In this embodiment, the number $Z_R$ of the rotor teeth is set as being 50.

Figure 4:
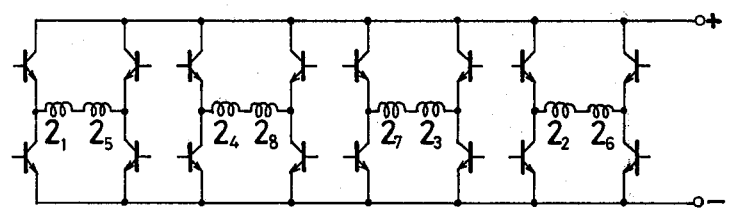
FIG. 4 is an example of a circuit diagram of the drive circuit for driving the windings wound in monofilar fashion.

The stepping motor constituted as above can provide six different step angles when operated according to the exciting sequence shown in tables 1 to 7. The sequences shown can be performed by a driving circuit in FIG. 4 in the case where the monofilarly wound windings $2_1$ to $2_8$ are excited in bipolar fashion or a driving circuit in FIG. 5 in the case where the bifilarly wound windings $(2_1', \overline{2}_1' \sim (2_8', \overline{2}_8')$ are unipolarly excited.

TABLE 1

| Step | $1_1$ | $1_2$ | $1_3$ | $1_4$ | $1_5$ | $1_6$ | $1_7$ | $1_8$ |
|---|---|---|---|---|---|---|---|---|
| 1 | S |   | N | S | N |   | S | N |
| 2 | S | N |   | S | N | S |   | N |
| 3 | S | N | S |   | N | S | N |   |
| 4 |   | N | S | N |   | S | N | S |
| 5 | N |   | S | N | S |   | N | S |
| 6 | N | S |   | N | S | N |   | S |
| 7 | N | S | N |   | S | N | S |   |
| 8 |   | S | N | S |   | N | S | N |
| 9 | S |   | N | S | N |   | S | N |

TABLE 2

| Step | $1_1$ | $1_2$ | $1_3$ | $1_4$ | $1_5$ | $1_6$ | $1_7$ | $1_8$ |
|---|---|---|---|---|---|---|---|---|
| 1 | S | S | N | S | N | N | S | N |
| 2 | S | N | N | S | N | S | S | N |
| 3 | S | N | S | S | N | S | N | N |
| 4 | S | N | S | N | N | S | N | S |
| 5 | N | N | S | N | S | S | N | S |
| 6 | N | S | S | N | S | N | N | S |
| 7 | N | S | N | N | S | N | S | S |
| 8 | N | S | N | S | S | N | S | N |
| 9 | S | S | N | S | N | N | S | N |

TABLE 3

| Step | $1_1$ | $1_2$ | $1_3$ | $1_4$ | $1_5$ | $1_6$ | $1_7$ | $1_8$ |
|---|---|---|---|---|---|---|---|---|
| 1 | S | S | N | S | N | N | S | N |
| 2 | S |   | N | S | N |   | S | N |
| 3 | S | N | N | S | N | S | S | N |
| 4 | S | N |   | S | N | S |   | N |
| 5 | S | N | S | S | N | S | N | N |
| 6 | S | N | S |   | N | S | N |   |
| 7 | S | N | S | N | N | S | N | S |
| 8 |   | N | S | N |   | S | N | S |
| 9 | N | N | S | N | S | S | N | S |
| 10 | N |   | S | N | S |   | N | S |
| 11 | N | S | S | N | S | N | N | S |
| 12 | N | S |   | N | S | N |   | S |
| 13 | N | S | N | N | S | N | S | S |
| 14 | N | S | N |   | S | N | S |   |
| 15 | N | S | N | S | S | N | S | N |
| 16 |   | S | N | S |   | N | S | N |
| 17 | S | S | N | S | N | N | S | N |

TABLE 4

| Step | $1_1$ | $1_2$ | $1_3$ | $1_4$ | $1_5$ | $1_6$ | $1_7$ | $1_8$ |
|---|---|---|---|---|---|---|---|---|
| 1 | S | N | S | S | N | S | N | N |
| 2 |   | N | S | N |   | S | N | S |
| 3 | N | S | S | N | S | N | N | S |
| 4 | N | S | N |   | S | N | S |   |
| 5 | S | S | N | S | N | N | S | N |
| 6 | S | N |   | S | N | S |   | N |
| 7 | S | N | S | N | N | S | N | S |
| 8 | N |   | S | N | S |   | N | S |
| 9 | N | S | N | N | S | S | N | S |
| 10 |   | S | N | S |   | N | S | N |
| 11 | S | N | N | S | N | S | S | N |
| 12 | S | N | S |   | N | S | N |   |
| 13 | N | N | S | N | S | S | N | S |
| 14 | N | S |   | N | S | N |   | S |
| 15 | N | S | N | S | S | N | S | N |
| 16 | S |   | N | S | N |   | S | N |
| 17 | S | N | S | S | N | S | N | N |

TABLE 5

| Step | $1_1$ | $1_2$ | $1_3$ | $1_4$ | $1_5$ | $1_6$ | $1_7$ | $1_8$ |
|---|---|---|---|---|---|---|---|---|
| 1 | S | N | N | S | N | S | S | N |
| 2 | S | N | S | N | N | S | N | S |
| 3 | N | S | S | N | S | N | N | S |
| 4 | N | S | N | S | S | N | S | N |
| 5 | S | N | N | S | N | S | S | N |

TABLE 6

| Step | $1_1$ | $1_2$ | $1_3$ | $1_4$ | $1_5$ | $1_6$ | $1_7$ | $1_8$ |
|---|---|---|---|---|---|---|---|---|
| 1 | S | N |   | S | N | S |   | N |
| 2 | N | N | S | N | S | S | N | S |
| 3 | N | S | N |   | S | N | S |   |
| 4 | S | N | N | S | N | S | S | N |
| 5 |   | N | S | N |   | S | N | S |
| 6 | N | S | N | N | S | N | S | S |
| 7 | S |   | N | S | N |   | S | N |
| 8 | S | N | S | N | N | S | N | S |
| 9 | N | S |   | N | S | N |   | S |
| 10 | S | S | N | S | N | N | S | N |
| 11 | S | N | S |   | N | S | N |   |
| 12 | N | S | S | N | S | N | N | S |
| 13 |   | S | N | S |   | N | S | N |
| 14 | S | N | S | S | N | S | N | N |
| 15 | N |   | S | N | S |   | N | S |
| 16 | N | S | N | S | S | S | S | N |
| 17 | S | N |   | S | N | N |   | N |

TABLE 7

| Step | $1_1$ | $1_2$ | $1_3$ | $1_4$ | $1_5$ | $1_6$ | $1_7$ | $1_8$ |
|---|---|---|---|---|---|---|---|---|
| 1 | S | N |   | S | N | S |   | N |
| 2 | S |   | N | S | N |   | S | N |
| 3 |   | S | N | S |   | N | S | N |
| 4 | N | S | N |   | S | N | S |   |
| 5 | N | S |   | N | S | N |   | S |
| 6 | N |   | S | N | S |   | N | S |
| 7 |   | N | S | N |   | S | N | S |
| 8 | S | N | S |   | N | S | N |   |
| 9 | S | N |   | S | N | S |   | N |

According to the sequences shown in the Tables 1 and 2, the step angle obtained becomes equal to the basic step angle $\theta_s$ and according to the sequence in the Table 3, the step angle becomes $\tfrac{1}{2}\theta_s$. Further, according to the sequences in the Tables 4 to 7, the step angle becomes $3/2\,\theta_s$, $2\theta_s$, $5/2\,\theta_s$ and $3\theta_s$, respectively.

In the above mentioned embodiments, the center lines of the respective stator poles are made coincident with the centers of the stator teeth groups of the stator poles, respectively, by using different widths of the slots each provided between the adjacent ones of the stator poles $1_1, 1_2, \ldots 1_8$. That is, the stator teeth $1a$ of the individual stator pole are arranged symmetrically with respect to the center line of the stator pole. However, it should be noted that the present invention is not limited to such arrangement. For example, the present invention can be also applicable to a motor having the stator poles $1_1, 1_2, \ldots 1_8$ arranged with a common pitch, i.e., 45°. In such case, the teeth formed on the respective stator poles $1_1$ to $1_8$ may be arranged asymmetrically with respect to the center lines of the stator poles so that the teeth arrangement satisfies the equations (2) and (2').

As described hereinbefore, the hybrid type stepping motor according to the present invention using the windings arranged in four phases has the basic step angle of a half the step angle of the conventional two-phase type stepping motor. Therefore, it is possible to realize the above mentioned various step angles. Furthermore, in the three or four-phase excitation shown in the Tables 1, 2, 5 and 7, there is no torque variation occurred and when an excitation sequence including alternative 3-phase and 4-phase excitations in the Tables 3, 4 and 6 is employed, it is possible to restrict the torque variation to 1:1.1.

When the basic step angle similar to that of the present motor is desired by the conventional 2-phase stepping motor, it is necessary to employ an excitation sequence including alternative 1-phase and 2-phase excitations and therefore there are inherent disadvantages of torque variation of $1:\sqrt{2}$ and of variation of response characteristics between steps.

What is claimed is:

1. A four-phase hybrid type stepping motor comprising a rotor, eight stator poles are formed on a plane facing to an outer side surface of said rotor with a plurality of stator teeth arranged with a common pitch $\tau_s$, opposing ones of said stator poles being paired and being separated from each other by 180°, and a plurality of windings wound in heteropolar on the four pairs of said stator poles, wherein a pitch between a center of said stator teeth of a first one ($1_1$) of said stator poles and a center of said stator teeth of a fourth one ($1_4$) of said stator poles, a pitch between said center of said stator teeth of said fourth stator pole and a center of said stator teeth of a seventh one ($1_7$) of said stator poles and a pitch between said center of said teeth of said seventh stator pole and a center of said stator teeth of a second one ($1_2$) of said stator poles are common and equal to $\tau_c$, said pitches $\tau_s$ and $\tau_c$ being set so that they satisfy the following equations:

$$\tau_s = K \cdot \tau_R \quad (0.9 \leq K \leq 1.1)$$

$$\tau_c = \frac{3 \cdot Z_R + a}{8} \cdot \tau_R$$

$$a = 8N - 3 \cdot Z_R \pm 1$$

where $\tau_R$ is a pitch of teeth of said rotor, $Z_R$ is the number of the teeth of said rotor and $N$ is an integer close to $3 \cdot Z_R/8$.

2. A four-phase hybrid type stepping motor as claimed in claim 1, wherein said windings are wound in monofilar.

3. A four-phase hybrid type stepping motor as claimed in claim 1, wherein said windings are wound in bifilar.

* * * * *